April 5, 1960 R. M. WILLIAMS 2,931,274
METHOD OF AND APPARATUS FOR INTERNAL GEAR SHAVING
Filed May 28, 1956 2 Sheets-Sheet 1

INVENTOR.
ROBERT M. WILLIAMS
BY Whittemore,
Hulbert & Belknap
ATTORNEYS

April 5, 1960     R. M. WILLIAMS     2,931,274
METHOD OF AND APPARATUS FOR INTERNAL GEAR SHAVING
Filed May 28, 1956     2 Sheets-Sheet 2
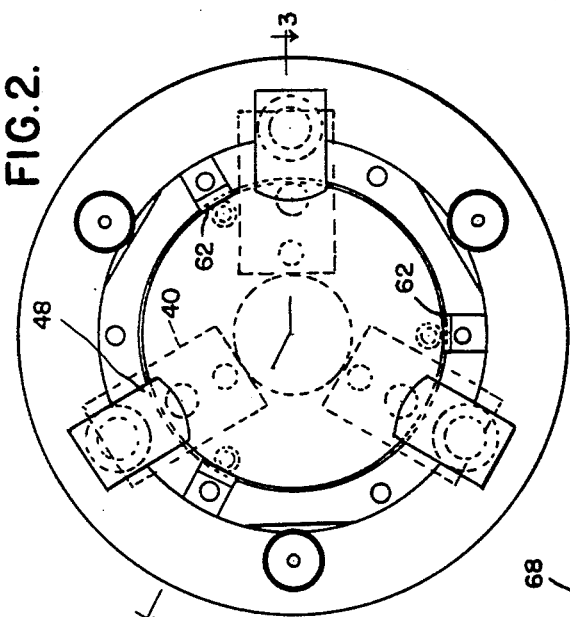
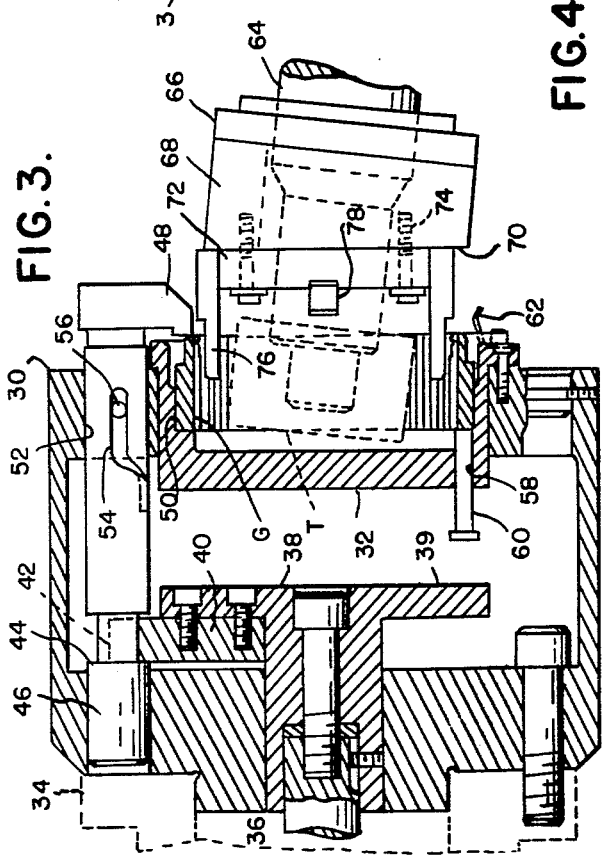
INVENTOR.
ROBERT M. WILLIAMS
BY Whittemore,
Hulbert & Belknap
ATTORNEYS

United States Patent Office 2,931,274
Patented Apr. 5, 1960

2,931,274
METHOD OF AND APPARATUS FOR INTERNAL GEAR SHAVING

Robert M. Williams, East Detroit, Mich., assignor to National Broach & Machine Company, Detroit, Mich., a corporation of Michigan Application May 28, 1956, Serial No. 587,829

11 Claims. (Cl. 90—1)

The present invention relates to internal gear shaving.

It is an object of the present invention to provide a method and apparatus for facilitating the finishing of internal gears, and more particularly for permitting semi-automatic loading.

It is a further object of the present invention to provide in a machine for finishing internal gears, means to facilitate placing an internal gear on a gear-like finishing tool, thereafter advancing the tool with the internal gear therein into a pot chuck, and finally clamping the internal gear in the chuck in meshed relation with the tool.

More specifically, it is an object of the present invention to provide approximate locating mechanism in association with a support for a gear-like cutter which permits positioning of an internal gear on the cutter in approximately located position for insertion into a pot chuck.

It is a further object of the present invention to provide in mechanism as described above, locating fingers adapted to extend loosely within an internal gear to prevent rocking of the gear on the gear-like tool, the pot chuck including clamping mechanism adapted to move the gear out of contact with the fingers.

It is a further object of the present invention to provide a pot chuck for receiving an internal gear approximately located in meshed relation on a tool in the form of an external gear, said chuck including clamping means adapted to shift the gear relative to approximate locating means associated with the tool into clearance position for free running.

It is a further object of the present invention to provide in a pot chuck, ejector pins, clamp means, means for actuating the clamp means to release the gear and simultaneously to actuate the ejector pins to push the gear out of the chuck, and springs for receiving and supporting the ejected gear at the front of the chuck.

Other objects and features of the invention will become apparent as the description proceeds, especially when taken in conjunction with the accompanying drawings, wherein:

Figure 2 is an enlarged front elevational view of a pot chuck.

Figure 3 is an approximately horizontal sectional view taken on the line 3—3, Figure 2, and showing the approximate locator mechanism in position.

Figure 4 is a side elevational view of the approximate locator mechanism.

Figure 5 is a fragmentary front elevational view of a portion of the approximate locator mechanism.

Figure 1:
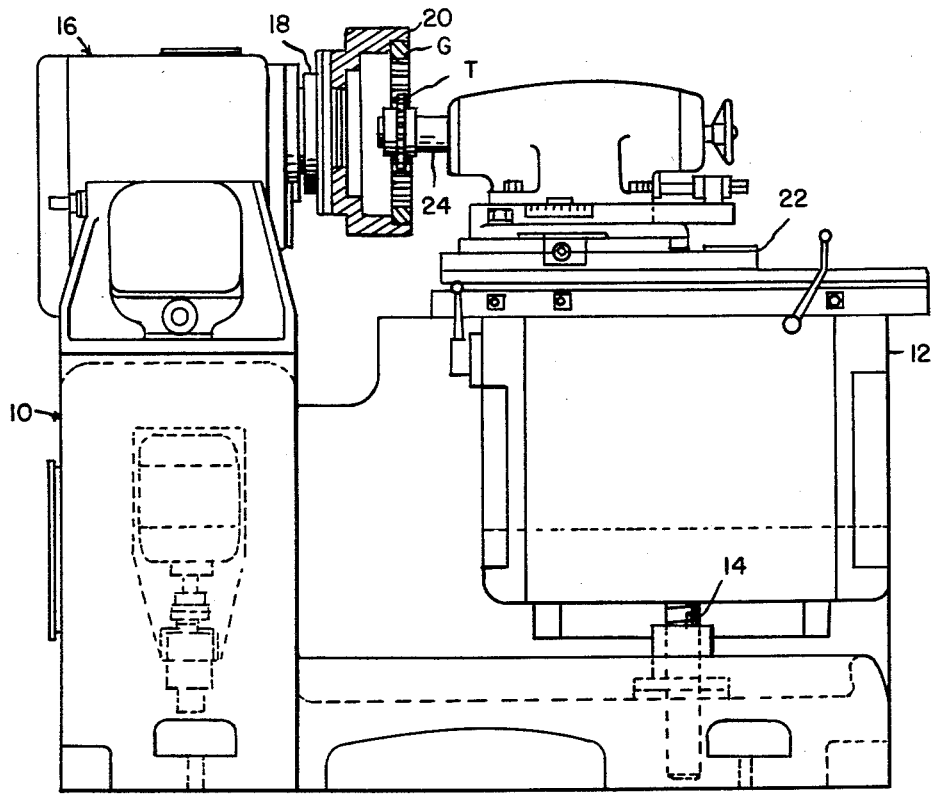
Figure 1 is a side elevational view partly in section, of an internal gear finishing machine.

Referring first to Figure 1, the present invention relates to an internal gear finishing machine of the type comprising a main frame 10 having a vertically movable knee 12 mounted thereon in vertical ways provided with means for effecting vertical movement of the knee including the feed screw 14. The gear finishing machine includes work supporting mechanism indicated generally at 16 which includes spindle means 18 adapted to be driven in rotation by a motor (not shown) and having at its ends a pot chuck indicated generally at 20.

Mounted on the knee 12 is a tool slide 22 mounted for horizontal movement toward and away from the open end of the chuck 20. Preferably, suitable means are provided for effecting a substantial movement of the tool slide to effect wide separation between the gear-like finishing tool T and the internal work gear G suitably clamped in position within the chuck 20. In addition, when the gear is clamped in position in the chuck and the tool T is in mesh therewith the cutter slide 22 is reciprocated slowly to effect a feeding movement parallel to the axis of the gear G. The tool spindle 24 is mounted for free rotation and the tool T is rotated by virtue of its meshing engagement with the gear G, which is positively driven in rotation.

In this type of machine considerable difficulty is encountered in effecting rapid loading and meshing of the cutter and gear after loading.

The usual manner of loading a series of work gears in an internal gear finishing machine of the type disclosed herein was to withdraw the cutter slide 22 substantially from the work supporting chuck to give working room for loading the gear into the chuck. Thereafter, the gear was moved into the chuck and clamped therein by suitable means (not shown in this figure). Thereafter, it was necessary to advance the tool slide to cause the tool T to move into meshed engagement with the gear G. This of course required exact angular location of the tool relative to the gear and required the operator to move the tool slowly into position to avoid possible damage if the ends of the cutter teeth engaged the ends of the gear teeth.

It will of course be appreciated that in Figure 1 for simplicity the gear and tool are both shown with their axes parallel. In practice, the finishing operation is normally carried out with a gear-like shaving cutter having gashed teeth providing cutting edges extending in planes perpendicular to the axis of the cutter, and the cutter is designed to mesh with the gear with the axes of the gear and cutter crossed at a substantial angle as for example between 3 degrees and 30 degrees. It will also be appreciated that in use it is normal for the knee 12 to be raised to a position such that the cutter is in mesh at the upper side of the gear G.

Referring now to Figures 2–5 there is illustrated the mechanism which greatly facilitates loading of the internal gear finishing machine.

In accordance with the present invention there is provided a special pot chuck designated 30 having therein a locating adaptor 32 designed for the particular gear being finished, the gear being shown at G. The chuck 30 is rigidly supported at the foreward end of the work driving spindle 34 and associated therewith is a drawbar 36 having a head 38 rigidly secured thereto. The head 38 includes an annular flange 39 to which is bolted or otherwise secured plates 40 having notched ends 42 fitting within annular grooves 44 in clamp elements 46. The clamp elements 46 have laterally extending clamping portions 48 adapted to overlie the outer end of the annular gear G and to clamp it firmly against a locating shoulder 50 located in the adaptor 32. The clamping elements 46 are longitudinally slidable in aligned cylindrical holes 52 in the chuck and are provided with pin receiving slots 54 adapted to receive guide pins 56. The slots 54 include straight portions and also inclined portions so that as the clamping element 46 is moved to the right from the position shown, it first moves out in a straight line and thereafter its further travel is accompanied by angular movement which moves the laterally extending clamping portion 48 into a clearance position with respect to the work gear G.

The adaptor 32 is also provided with a plurality of pin receiving openings 58 which receive ejector pins 60 in position to be engaged by the flange 39 of the head 38 connected to the drawbar.

The fixture or adaptor 32 is also provided with a plurality of retainer springs 62 which are adapted to engage and support a work gear G when it is moved to the right from its illustrated position by the ejector pins 60. This permits the operator to pick the finished gear off of the work supporting head.

Associated with the chuck 30 is the tool support mechanism which includes a tool spindle 64 adapted to support the gear finishing tool T at its outer end. In Figure 3, which shows the tool T as located within the gear G, it will be observed that the axis of the spindle 64 extends at a definite angle with respect to the axis of the gear G.

The spindle 64 is mounted in a cutter spindle housing at the forward end of which is provided an end plate 66. Secured to the end plate 66 is an annular adaptor 68 which surrounds the forward end of the tool spindle and which is provided with an end face 70 confronting the chuck 30, the end face being perpendicular to the axis thereof. Fastened to the end face 70 of the adaptor 68 is the approximate locator 72, the attachment means being suggested in Figure 3 as comprising screws 74.

The approximate locator 72, as best seen in Figures 4 and 5, may be generally of semi-circular shape and dimensioned to surround the forward end of the tool spindle 64. Extending forwardly and parallel to the axis of the gear G are a pair of locating fingers 76. These fingers are designed to extend within the work gear G with a certain amount of looseness so as to prevent rocking movement of the gear G when it is placed in meshing relation on the cutter or tool T while the tool is in its retracted position remote from the chuck 30. In Figure 4 the relationship of parts is well illustrated, the fingers 76 extending forwardly at opposite sides of the tool T. In this figure a portion of the work gear G is illustrated below the tool T and having its inner surface engaged with a light spring 78 having its forward end inclined as illustrated to facilitate movement of the gear into position with the teeth at the top thereof in mesh with the teeth at the top of the tool T and with the teeth at the bottom thereof engaged by the spring 78.

With the parts as described, the operation is believed apparent but will be briefly reviewed.

In the first place the operator upon completion of a gear finishing operation causes the cutter slide to move substantially to the right from the position shown in Figure 3, to withdraw the cutter to a position completely removed from the chuck 30. Advancement of the drawbar 36 releases the work piece in the chuck, moves the clamping elements 46 outwardly and rotates the clamping portions 48 thereof into clearance position. Final movement of the drawbar to the right, as seen in the figure results in forward movement of the ejector pins 60 which releases the gear G from the chuck and leaves it supported on the relatively light springs 62.

The operator now manually removes the finished gear from the springs 62. He then places an unfinished gear manually in position on the gear shaving tool and moves it to a position in which its lower teeth move beneath the spring 78. This supports the unfinished gear on the cutter for further movement. In addition, this assembly of the unfinished gear on the tool results in placement of the gear in such a way that the locating fingers 76 extend within the gear. These fingers are designed to have appreciable clearance with respect to the inner ends of the gear teeth and are for the purpose of preventing rocking movement of the gear. So long as the gear is firmly retained on the cutter by the spring 78, the gear need never contact the locating fingers 76.

With the gear in properly meshed relation on the cutter, the cutter slide is now moved toward the chuck to a position in which the gear is partly received within the chuck. At this time however, forward movement of the tool slide is to the approximate position shown in Figure 3, which leaves the spring 78 substantially outside the chuck. At this time the drawbar is retracted which results in first rotating the clamping portions 48 of the clamping elements 46 to a position in which they overlie the end of the gear and thereafter in axial movement of the clamping elements to shift the gear to the position illustrated in Figure 3 against the locating shoulder 50 where it is firmly clamped in position. The drawbar may be actuated by suitable means such for example as an air cylinder (not shown).

It will be observed that actuation of the clamping elements has the effect of shifting the gear away from the approximate locator although not sufficiently to move it out of mesh with the gear-like tool T. The gear is thus moved away from the spring 78 which results in its being mounted for free rotation with the chuck 30. The clamping of the gear G in the adaptor 32 also results in accurate centering thereof so that it is in a position of definite radial clearance with respect to the approximate locating fingers 76. Thus, when the spindle is rotated the gear rotates therewith free from contact with any portion of the locating fixture and thus, is adapted for free rotation with the chuck 30. The meshed engagement between the gear G and the tool T results in rotation of the tool. The machining operation, as is well understood, is accomplished by a slow traverse of the cutter slide in a direction parallel to the axis of the gear spindle to extend the finishing action of the tool longitudinally of the internal teeth of the gear.

It will be understood that with the foregoing arrangement, resharpening of the cutter requires a compensating vertical adjustment of the knee 12 both to position the cutter properly for the machining operation and also to locate the meshed work gear properly for advancement into the chuck.

The present invention takes advantage of the fact that it is possible quickly and easily to place the work gear in properly meshed relation on the exposed cutter and thereafter to feed the meshed gear and cutter combination into the chuck. This is much simpler and safer than attempting to clamp the gear in the chuck and thereafter to feed the cutter into properly meshed relation therewith. This latter operation requires accurate angular position of the cutter and any failure accompanied by relatively rapid traverse of the cutter toward the gear may result in damage to the expensive cutter.

In the machines specifically described in the foregoing, means are provided for positively rotating the work holder. The tool in this case is driven due to its meshing engagement with the work gear. It will of course be understood that if desired, the work spindle may be freely rotatable and rotation imparted directly to the tool spindle.

It will also be understood that if desired, the approximate locator may include forwardly extending fingers engageable with the outer surface rather than the inner surface of the work gear as it is supported on the cutter, to prevent rocking of the work gear. Since this arrangement might in some cases interfere with operation of the clamping elements 48, the means on the approximate locator engageable with the outer surface of the work gear may be associated with a work clamping chuck including radially movable clamping members.

The drawings and the foregoing specification constitute a description of the improved method of and apparatus for internal gear shaving in such full, clear, concise and exact terms as to enable any person skilled in the art to practice the invention, the scope of which is indicated by the appended claims.

What I claim as my invention is:

1. The method of loading internal gears into a gear finishing machine having an external gear-like tool required to roll in mesh with the gear during the finishing operation, which comprises positioning the tool outwardly from a gear-receiving chuck, placing the internal gear on the tool in mesh therewith and suspended thereon, thereafter relatively moving the tool with the gear thereon and the chuck to bring the gear into the chuck, and clamping the gear in the chuck while it remains in mesh with the tool.

2. The method of loading internal gears into a gear finishing machine having an external gear-like tool required to roll in mesh with the gear during the finishing operation, which comprises positioning the tool outwardly from a gear-receiving chuck, placing the internal gear on the tool in mesh therewith and suspended thereon, supporting the gear against rocking on the tool, moving the tool into the chuck to bring the gear into the chuck, and clamping the gear in the chuck while it remains in mesh with the tool.

3. The method of loading internal gears into a gear finishing machine having an external gear-like tool required to roll in mesh with the gear during the finishing operation, which comprises positioning the tool outwardly from a gear-receiving chuck, placing the internal gear on the tool in mesh therewith and suspended thereon, supporting the gear against rocking on the tool, moving the tool into the chuck to bring the gear into the chuck, moving the gear while still in mesh with the tool into fully seated position in the chuck and into a position of free rotation in meshed relation with the tool.

4. An internal gear finishing machine comprising a base, work support means thereon comprising a pot chuck, a tool slide on said base movable toward and away from the open end of said chuck, a tool spindle housing on said slide, a tool spindle in said spindle housing extending beyond one end thereof and adapted to rotatably support a gear-like tool thereon, an approximate locator carried by said housing engageable with an internal gear placed in mesh with and suspended on the tool on said spindle while the tool is in position to support the internal gear exterior to said pot chuck, means for advancing the tool slide to position the gear in said chuck, and clamping means in said chuck operable to clamp the internal gear in said chuck while it remains in mesh with said tool.

5. An internal gear finishing machine comprising a base, work drive means thereon comprsing a pot chuck, a tool slide on said base movable toward and away from the open end of said chuck, a tool spindle housing on said slide, a tool spindle in said spindle housing extending beyond one end thereof and adapted to rotatably support a gear-like tool thereon, an approximate locator carried by said housing engageable with the inner surfaces of an internal gear placed in mesh with and suspended on the tool on said spindle, means for advancing the tool slide to position the gear in said chuck, and clamping means in said chuck operable to draw the gear partly away from said locator out of contact therewith and clamp the internal gear in said chuck while it remains in mesh with said tool.

6. An internal gear finishing machine comprising a base, work drive means thereon comprising a po. chuck, a tool slide on said base movable toward and away from the open end of said chuck, a tool spindle housing on said slide, a tool spindle in said spindle housing extending beyond one end thereof and adapted to rotatably support a gear-like tool thereon, an approximate locator carried by said housing having a pair of fingers loosely engageable within an internal gear suspended on the tool in mesh therewith to prevent rocking of the gear thereon, means for advancing the tool slide to position the gear in said chuck, and clamping means in said chuck operable to clamp the internal gear in said chuck while it remains in mesh with said tool.

7. An internal gear finishing machine comprising a base, work drive means thereon comprising a pot chuck, a tool slide on said base movable toward and away from the open end of said chuck, a tool spindle housing on said slide, a tool spindle in said spindle housing extending beyond one end thereof and adapted to rotatably support a gear-like tool thereon, an approximate locator carried by said housing having a pair of fingers loosely engageable within an internal gear suspended on the tool in mesh therewith to prevent rocking of the gear thereon, means for advancing the tool slide to position the gear in said chuck, and clamping means in said chuck operable to clamp the internal gear in said chuck while it remains in mesh with said tool, said fingers being in clearance with respect to the gear when it is clamped in said chuck.

8. An internal gear finishing machine comprising a base, work drive means thereon comprising a pot chuck, a tool slide on said base movable toward and away from the open end of said chuck, a tool spindle housing on said slide, a tool spindle in said spindle housing extending beyond one end thereof and adapted to rotatably support a gear-like tool thereon, an approximate locator carried by said housing having a pair of fingers loosely engageable within an internal gear suspended on the tool in mesh therewith to prevent rocking of the gear thereon and a spring to engage the bottom inner surface of the gear, means for advancing the tool slide to position the gear in said chuck, and clamping means in said chuck operable to clamp the internal gear in said chuck while it remains in mesh with said tool.

9. An internal gear finishing machine comprising a base, work drive means thereon comprising a pot chuck, a tool slide on said base movable toward and away from the open end of said chuck, a tool spindle housing on said slide, a tool spindle in said spindle housing extending beyond one end thereof and adapted to rotatably support a gear-like tool thereon, an approximate locator carried by said housing having a pair of fingers loosely engageable within an internal gear suspended on the tool in mesh therewith to prevent rocking of the gear thereon and a spring to engage the bottom inner surface of the gear, means for advancing the tool slide to position the gear in said chuck, and clamping means in said chuck operable to clamp the internal gear in said chuck while it remains in mesh with said tool, the clamping means including movable members engageable with the gear and operable to draw it out of contact with said spring.

10. An internal gear finishing machine comprising a rotary work support including an open-ended pot chuck and a tool support, including a rotary spindle, means for relatively moving said supports to move a gear-like tool from a working position within said chuck to a loading position spaced outwardly from the open end of said chuck, locator means on said tool support engageable with an internal gear suspended in mesh on a tool on said spindle to guide the gear into said chuck as the tool is moved therein, and clamp means in said chuck for clamping the gear therein.

11. An internal gear finishing machine comprising a rotary work support including an open-ended pot chuck and a tool support, including a rotary spindle, means for relatively moving said supports to move a gear-like tool on said spindle from a working position within said chuck to a loading position spaced outwardly from the open end of said chuck, locator means on said tool support engageable with an internal gear suspended in mesh on a tool on said spindle to guide the gear into said chuck as the tool is moved therein, and clamp means in said chuck for clamping the gear therein, said locator means and said clamp means being constructed to provide for movement of the gear out of contact with said locator means as it is clamped by said clamp means in said chuck.

References Cited in the file of this patent

UNITED STATES PATENTS

| | | |
|---|---|---|
| 1,022,761 | Stvanek | Apr. 9, 1912 |
| 1,036,994 | Garvin et al. | Aug. 27, 1912 |
| 1,989,652 | Drummond | Jan. 29, 1935 |
| 2,280,045 | Miller | Apr. 14, 1942 |
| 2,733,072 | Hohwart et al. | Jan. 31, 1956 |
| 2,736,238 | Moncrieff | Feb. 28, 1956 |
| 2,773,426 | Fowler et al. | Dec. 11, 1956 |